UNITED STATES PATENT OFFICE.

EDWIN C. ECKEL, OF WASHINGTON, DISTRICT OF COLUMBIA.

PROCESS OF OBTAINING POTASH FROM GREENSAND.

1,011,172.  Specification of Letters Patent.  Patented Dec. 12, 1911.

No Drawing.  Application filed November 22, 1910. Serial No. 593,706.

*To all whom it may concern:*

Be it known that I, EDWIN C. ECKEL, a citizen of the United States, residing at Washington, District of Columbia, have invented certain new and useful Improvements in Processes of Obtaining Potash from Greensand, of which the following is a specification.

This invention relates to the production or manufacture of potash or potassium salts and has for its object to provide a cheap and commercially practical process for making such products directly from a natural material, which has hitherto been a matter of considerable difficulty.

I am aware that the extraction of potash from natural materials or minerals has been proposed, such for example as the treatment by various processes of feldspar (orthoclase) for the recovery of the potassic constituent therefrom, but so far as I know the results have been commercially unsatisfactory, or at least, the success thereof has not been demonstrated.

The process forming the subject of the present invention embodies the recovery of potash from natural silicates of potash and iron, and particularly from the mineral glauconite, also known as greensand. The use of this mineral as a source of potash has many advantages, particularly as compared to feldspar, of which the following may be mentioned: the cost of feldspar is greater than that of greensand, since it must be blasted out of igneous rock and carefully separated preparatory to further treatment, while greensand is found in naturally available condition, in thick beds or homogeneous deposits, and in granular condition, and is readily obtainable; also, greensand usually contains a proportionally larger potash constituent; and furthermore, the decidedly important advantage exists that greensand is comparatively unstable and can be decomposed for the recovery of its potash by simple heating, or by heating with reagents. The use and treatment of greensand for the purpose stated is thus free from the disadvantages and difficulties incident to the use of the more refractory silicates such as feldspar.

In the simplest form of the process, the greensand is heated, with or without preparatory purification, in a suitable kiln, to a moderate temperature, say 900° C. or thereabout and the potash is volatilized, and is then conducted to, and condensed in, a suitable chamber, and usually solidifies in the form of crystals. Any desirable kind of condenser may be used, provided with means to reduce the temperature sufficiently to solidify the gaseous product.

When the heating is performed in the presence of an excess of air as in many types of kiln, the greensand breaks down, and the first action is supposed to be the change of the ferrous silicate of the greensand to ferric oxid, and at the same or a slightly higher temperature the potash begins to be liberated and continues as the temperature rises, until it is practically all driven off, and the volatilized potash is caught and condensed as crystals giving a relatively pure product. This simple treatment is effective and entirely practicable, and its advantages and commercial value are obvious. The residue in the kiln will consist of ferric silicate, iron oxid, and possibly some remaining potash or potassium silicate. When a low temperature is employed, the greensand remains in granular form, but a sufficient increase of the temperature results in the formation of a glass or slag residue, which may be leached to extract the remaining potash, if any.

Under some conditions, or for reasons which may be found to be advisable, certain additions to or modifications of the simple treatment above described are practical and may be advisable. Thus pyrite or other source of sulfur or sulfuric acid may be added to the greensand before heating. This will be found to lower the temperature necessary to produce the volatilization and to give a better extraction. The application of heat will in this case result in the liberation of potash or other potassium salt by simple volatilization as in the first instance, which salt can be recovered by condensation, and also in the formation of soluble compounds of potassium and sulfur in the residue, which compounds can be extracted by leaching or other suitable method. The addition of pyrite or an equivalent sulfur salt such as gypsum assists the chemical reaction, which is believed to involve the replacing of the potash in the greensand by iron and the combination of the unvolatilized potash with the sulfur to form a soluble potassium salt.

Another modification which may be employed is the addition of lime to the greensand, in quantity sufficient to promote the reaction, which quantity may be in a proportion of 10% or less. This may be in the form of quicklime or other calcium compound. Quicklime when added hastens the action, and the calcium replaces the potassium of the greensand, and the potash comes off at a lower temperature, or is more completely extracted at a similar temperature, than when no such addition is made. If other calcium compounds are used, such as calcium carbonate, the same action will result, but in addition there will be formed soluble potassium salts, of which those which are volatilized at the temperature employed will be recovered by condensation, and those which are not can be recovered by leaching the residue.

The pyrite, gypsum, and calcium compounds referred to are mentioned because of their cheapness and availability. The use thereof, as compared to the simple extraction of the potash by heating the greensand, will in practice depend upon local conditions and such comparative economy or expense of operation as may develop from trial; in other words, the additional constituents of the material treated may be used if it pays, and if used, any compound may be selected which contains a base which will unite with the other constituents of the greensand to replace, and thus assist the liberation of, the potassium constituent.

The form in which the potash is recovered will depend on the type of kiln, the type of fuel, and whether the greensand is heated separately or in a mixture with something else. When heated separately without the presence of fuel gases, the product will be recovered largely or entirely as potassium hydrate; if fuel gases are allowed access to the heated greensand the product will contain a greater or smaller amount of potassium carbonate; when sulfur compounds are used potassium sulfate will also form a part of the products recovered by either leaching or condensation.

Having thus described my invention, what I claim as new and desire to secure by Letters Patent is:—

1. The process of obtaining potash, comprising heating a natural potassiferous iron silicate at a temperature insufficient to form a cement clinker and sufficient to volatilize the potash, and recovering the potash evolved.

2. The process of obtaining potash, comprising heating a natural potassiferous iron silicate in the presence of a substance insufficient in quantity to form a cement clinker, said substance containing a base which will unite with constituents of the said silicate to liberate its potash, until the potash is volatilized, and recovering the potash evolved.

3. The process of obtaining potash and other potassium compounds, comprising heating greensand in the presence of a salt insufficient in quantity to form a cement clinker and the base of which salt will unite with the other constituents of the greensand to liberate the potash, and recovering the potassium compounds so formed.

4. The process of obtaining potash and other potassium compounds, comprising heating a mixture of greensand and a salt whose base will unite with the other constituents of the greensand to liberate the potash, condensing the volatilized products, and recovering the remaining potassium compounds from the residue.

5. The process of obtaining potash and other potassium compounds, comprising heating a mixture of greensand and a sulfur bearing salt containing a constituent which will unite with constituents of the greensand, until potash is volatilized, condensing the volatilized product, and leaching the residue.

6. The process of obtaining potash or other potassium compounds, comprising heating a mixture of greensand and a calcium salt containing sulfur until potash is volatilized, condensing the volatilized product and leaching the residue.

In testimony whereof, I affix my signature in presence of two witnesses.

EDWIN C. ECKEL.

Witnesses:
  GEO. E. TEW,
  C. W. FOWLER.